United States Patent [19]

van de Loo

[11] 3,946,298

[45] Mar. 23, 1976

[54] SHAFT POSITIONING MECHANISM

[75] Inventor: Hansjuergen van de Loo, Langen-Neurott, Germany

[73] Assignee: Acme-Cleveland Corporation, Cleveland, Ohio

[22] Filed: June 6, 1974

[21] Appl. No.: 476,914

[52] U.S. Cl. .............................. 318/685; 318/696
[51] Int. Cl.² ........................................ G05B 19/40
[58] Field of Search .............. 318/685, 696, 60, 602, 318/254

[56] References Cited
UNITED STATES PATENTS

| | | | |
|---|---|---|---|
| 3,586,953 | 6/1971 | Markkanen | 318/685 |
| 3,605,000 | 9/1971 | Inaba | 318/696 |
| 3,720,865 | 3/1973 | Bregault | 318/254 |
| 3,760,252 | 9/1973 | Beery | 318/685 |
| 3,766,459 | 10/1973 | McIntosh | 318/685 |
| 3,777,245 | 12/1973 | May | 318/685 |

*Primary Examiner*—James R. Scott
*Attorney, Agent, or Firm*—Woodling, Krost, Granger & Rust

[57] ABSTRACT

A rotatable shaft positioning mechanism is disclosed for use with a multiple spindle automatic machine tool having a plurality of rotatable spindles in an indexable spindle carrier. A Hall effect sensor is actuated by a permanent magnet rotating with each spindle to develop a reference signal which starts a counter counting pulse generated by a pulse generator connected to the output of a stepping motor. The stepping motor is connected to rotate the spindle and when the counter counts out, the spindle is stopped at the preset position. The spindle is held in place and the machine tool may be operated for performing a machining function on a workpiece held in the spindle, for example, a cross drilling attachment, cross-tapping attachment or alternatively, the spindle may be rotated at a slow speed by the stepping motor to perform a contouring or assembling operation on a workpiece in the spindle. The foregoing abstract is merely a resume of one general application, is not a complete discussion of all principles of operation or applications, and is not to be construed as a limitation on the scope of the claimed subject matter.

24 Claims, 7 Drawing Figures

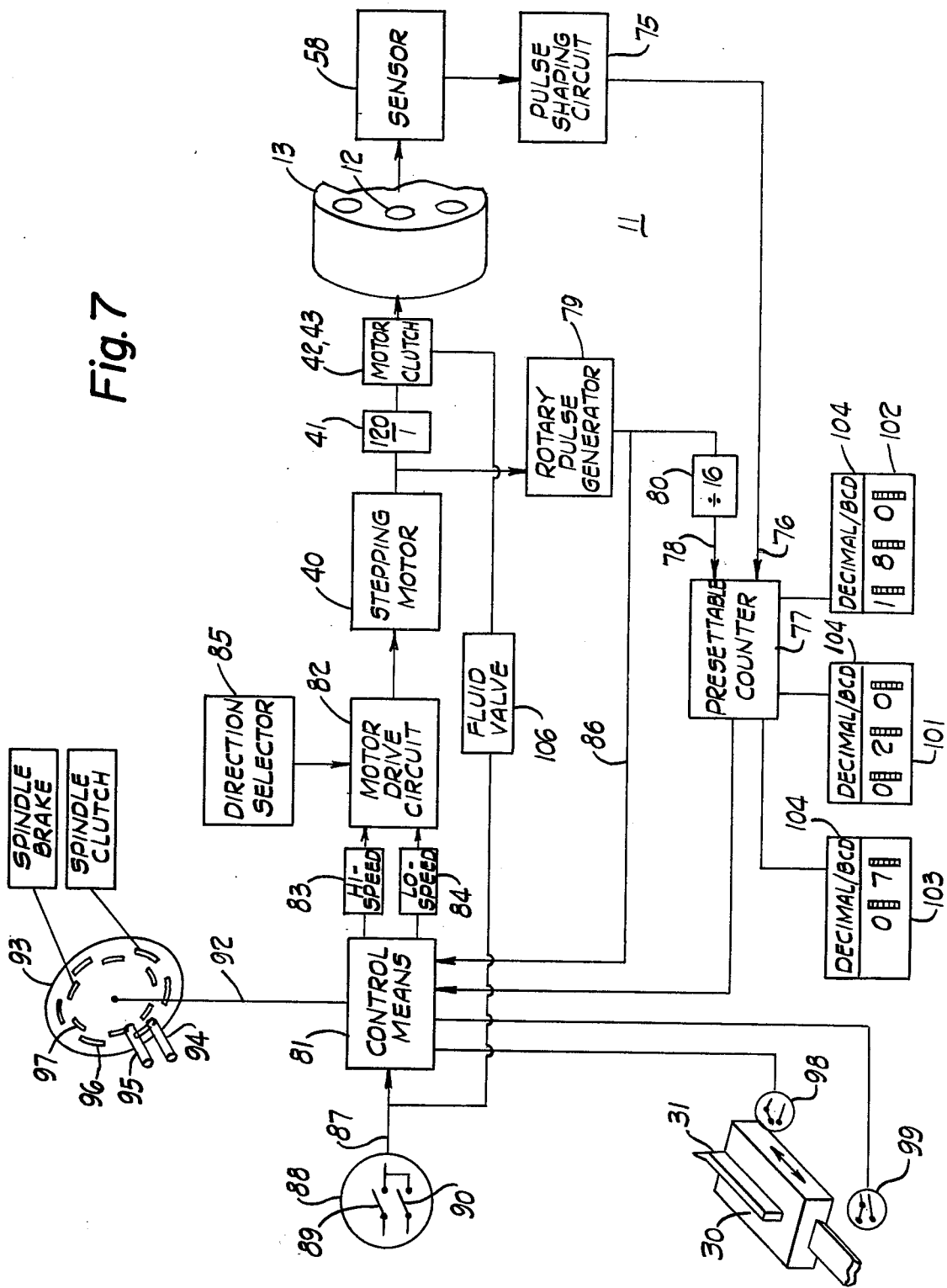

SHAFT POSITIONING MECHANISM

BACKGROUND OF THE INVENTION

Multiple spindle automatic machines are used where identical parts are required to be turned out, for example, by the millions. The typical multiple spindle automatic is operated by a cam to control movements of the various cross slides and end tool slide to perform the machining functions on workpieces held in each of the multiple spindles. Spindle stopping has been known wherein a spindle in a single one of the multiple spindle positions may be stopped, in order to perform some special machining function thereon. In such case a clutch and a brake are provided for each spindle to be selectively actuated at a particular spindle position of the spindle carrier. Spindle positioning devices have also been known, but in general these require the operation of some kind of a cam or hydraulic drive and using either a pin or a roller and cam for positioning. In both mechanisms the set-up has to be altered if a change-over to another machining job has to be made. Furthermore, the existing attachments for spindle positioning are rather space consuming and therefore, can only be applied to chucking machines and not to bar machines which require a hollow spindle for the bar workpieces.

A Hall effect oscillator has also been known in connection with stopping the position of a sewing machine shaft, at either the high point or low point of the sewing machine needle. This device directly controlled the electrical brake and electrical clutch on the machine tool shaft to attempt to position the machine shaft. To position a sewing machine needle at either the high point or the low point, the sewing machine shaft might be controlled within plus or minus 20° of the desired location and this would still be satisfactory, however, this is not satisfactory for machine tools. For example, if it is desired to first drill a hole perpendicular to the workpiece axis and then later in another spindle location it is desired to tap that same cross-hole, then the positioning accuracy must be within 1° for each of the two positioning devices, otherwise, the tap will be broken. Accordingly, the known devices for stopping and positioning a machine shaft at a precise position are not of sufficient accuracy.

Accordingly, an object of the invention is to provide a shaft rotational positioning mechanism with a high degree of flexibility, with ease in the tooling set-up and with better accuracy.

Another object of the invention is to provide a spindle positioning mechanism which is a universal positioning attachment suitable for addition to any one of the spindle positions of a multiple spindle automatic machine tool and for use on either bar or chucking machines.

Another object of the invention is to provide a spindle positioning mechanism wherein repetitive positioning during one machine cycle allows for several cross operations in one station, such as cross-drilling a workpiece from one side and then to deburr it from the opposite side.

Another object of the invention is to provide a spindle positioning mechanism which will permit a contouring operation where the spindle may be rotated at a relatively slow speed in connection with a tool moved by a cross-slide or an end tool slide.

Another object of the invention is to provide a spindle positioning mechanism utilizing a Hall effect sensor to provide a reference signal or pulse.

Another object of the invention is to provide a spindle positioning mechanism wherein a reference signal pulse is developed by a Hall effect sensor in accordance with rotation of the spindle and then a pulse generator generates a plurality of pulses for each rotation of the spindle and these pulses are counted in order to determine the precise position of stopping of the spindle.

SUMMARY OF THE INVENTION

The invention may be incorporated in a rotatable shaft positioning mechanism, comprising, in combination, sensor means, means to establish a reference signal output of said sensor means in accordance with rotation of the shaft, a motor, means to connect said motor to rotate the shaft, means generating a pulse for each minor fraction of a revolution of the shaft, and means to control the shaft in accordance with the pulses from said generator means.

Other objects and a fuller understanding of the invention may be had by referring to the following description and claims, taken in conjunction with the accompanying drawing.

BRIEF DESCRIPTION OF THE DRAWING

FIG. 7 is a schematic diagram of the circuit of the spindle positioning mechanism.

DESCRIPTION OF THE PREFERRED EMBODIMENT

Figure 1:
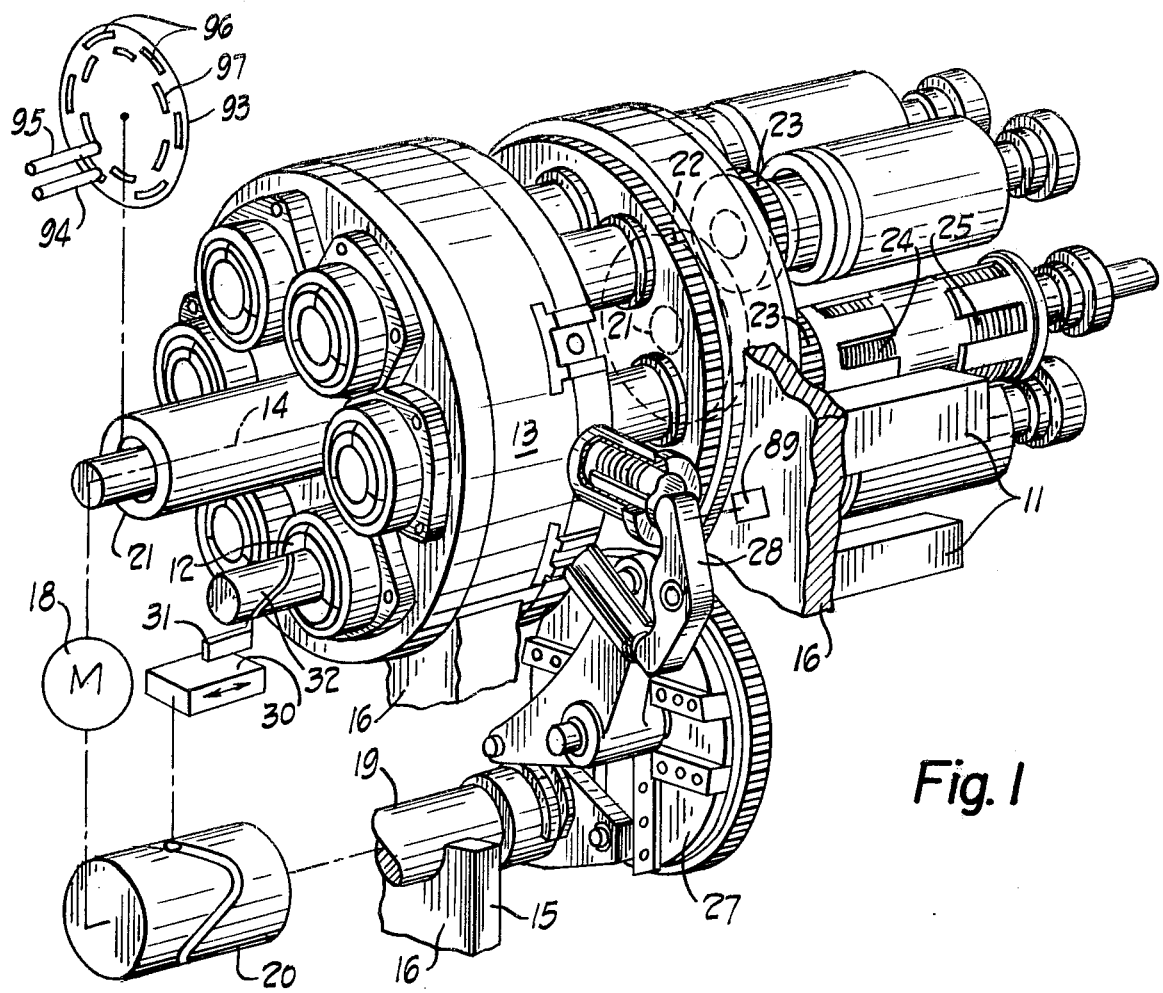
FIG. 1 is an isometric view of a multiple spindle carrier of a machine tool in which the invention is embodied.
Figure 2:
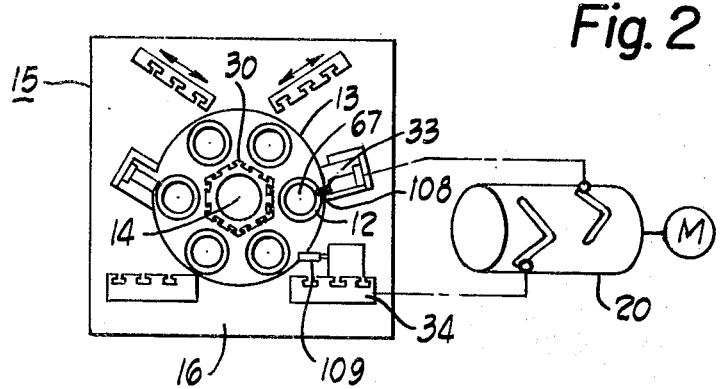
FIG. 2 is a partial vertical elevational view of a multiple automatic spindle machine tool embodying the invention.

The figures of the drawing illustrate the preferred embodiment of a rotatable shaft positioning mechanism 11 which is shown as positioning a spindle 12 in a precise orientation of the spindle relative to a spindle carrier 13 and its axis of rotation 14. The spindle carrier 14 in this preferred embodiment is a part of a multiple spindle automatic machine tool 15 having a frame 16. FIGS. 1 and 2 show the main parts of this multiple spindle automatic machine tool 15. The spindle carrier 13 is journalled in the frame 16 to be rotatably indexed into a plurality of positions equal in number to the number of spindles 12. Six spindles are shown in this particular machine 15 although any plurality may be used. A drive means motor 18 is provided on the frame to rotate a main cam shaft 19, a cam drum 20 and a central drive shaft 21. The drive shaft 21 has a central gear 22 meshing with and driving individual spindle gears 23 on each of the spindles 12. The drive to each individual spindle also includes a spindle clutch 24 and a spindle brake 25. These may be mechanically actuated, or as shown, they may be electromagnetically actuated. With the clutch 24 engaged, drive from the central shaft 21 effects rotation of the individual spindle and with this clutch disengaged and the brake 25 engaged, the individual spindle is stopped.

The spindle carrier 13 is indexed by an indexing mechanism shown as including a Geneva gear and including a locking arm 28 to lock the spindle carrier in position after each index. The cam means 20 is used to provide reciprocating movement of an end tool slide 30 which moves parallel to the spindle carrier axis 14 and carries a tool 31 for operating on a workpiece 32 in any selected spindle position of the carrier 13. Workpieces could be provided in each spindle, but are omitted for clarity in the FIG. 1. The cam means 20 also reciprocates a plurality of cross-slides including the cross-slides 33 and 34 shown in FIG. 2. Two of the spindle positioning mechanisms 11 are shown in FIG. 1, one for each of two spindle positions of the spindle carrier 13.

Figure 3:
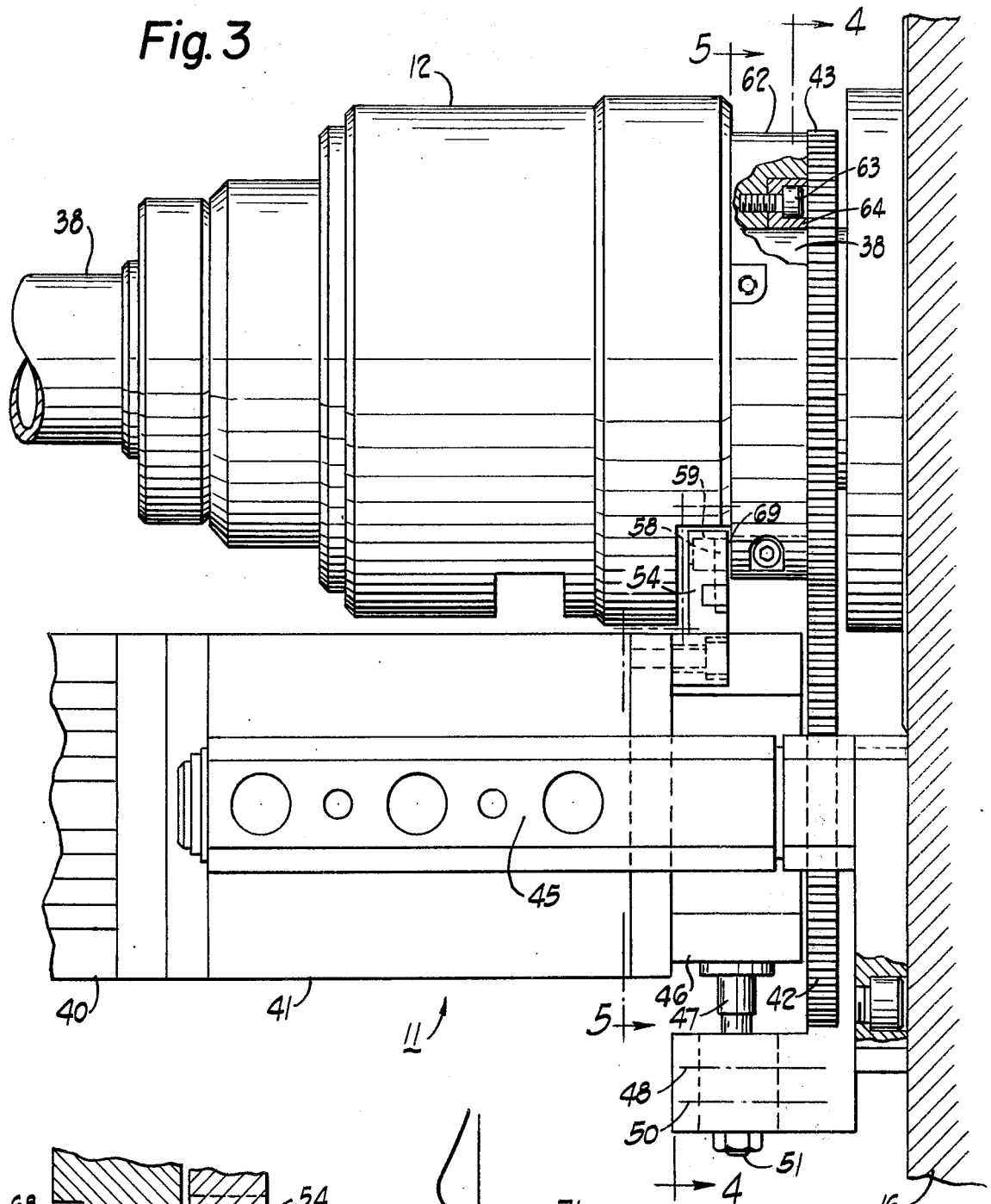
FIG. 3 is a plan view of the spindle positioning mechanism.
Figure 4:
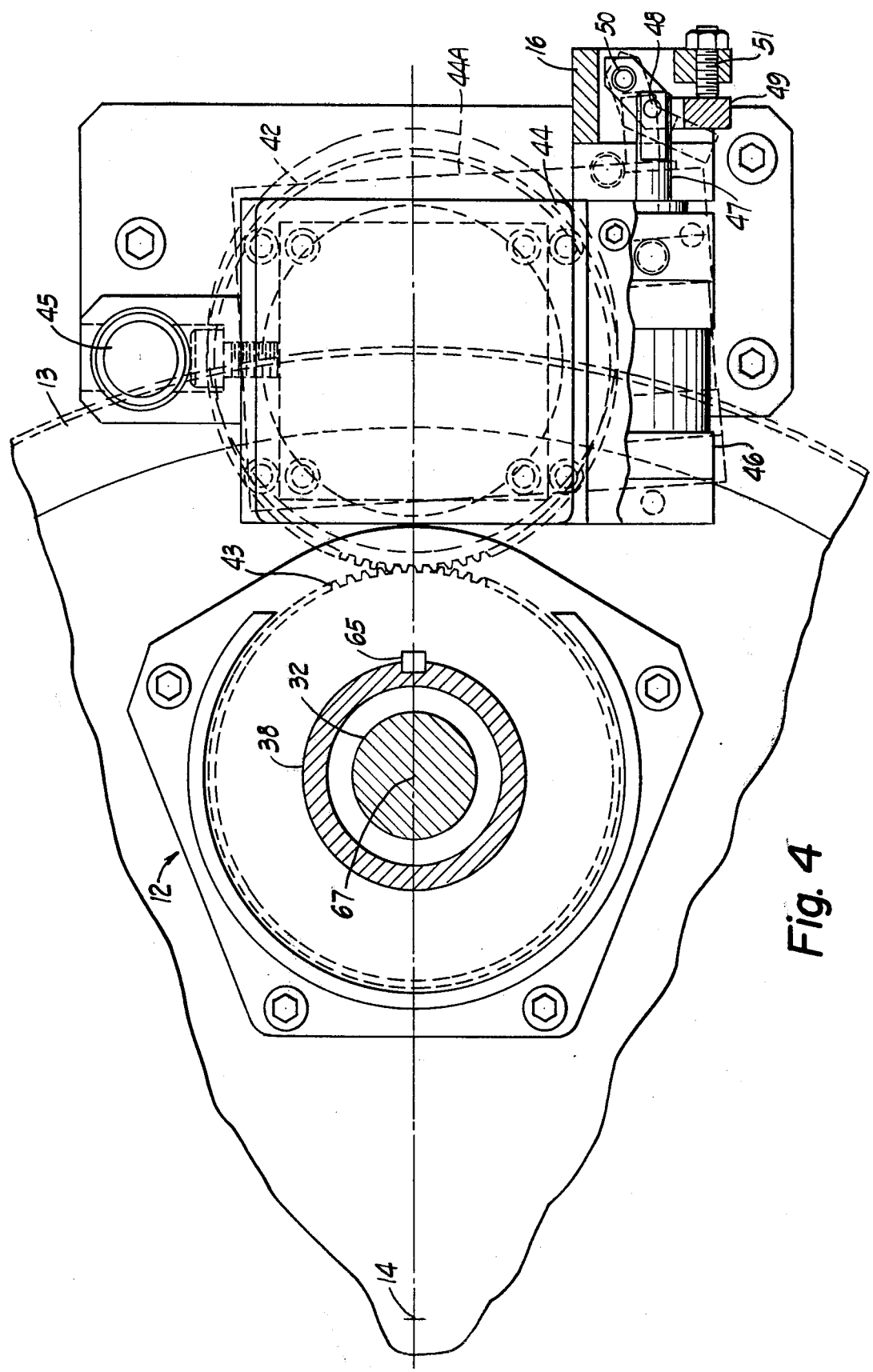
FIGS. 4 and 5 are sectional views on lines 4—4 and 5—5 of FIG. 3.
Figure 5:
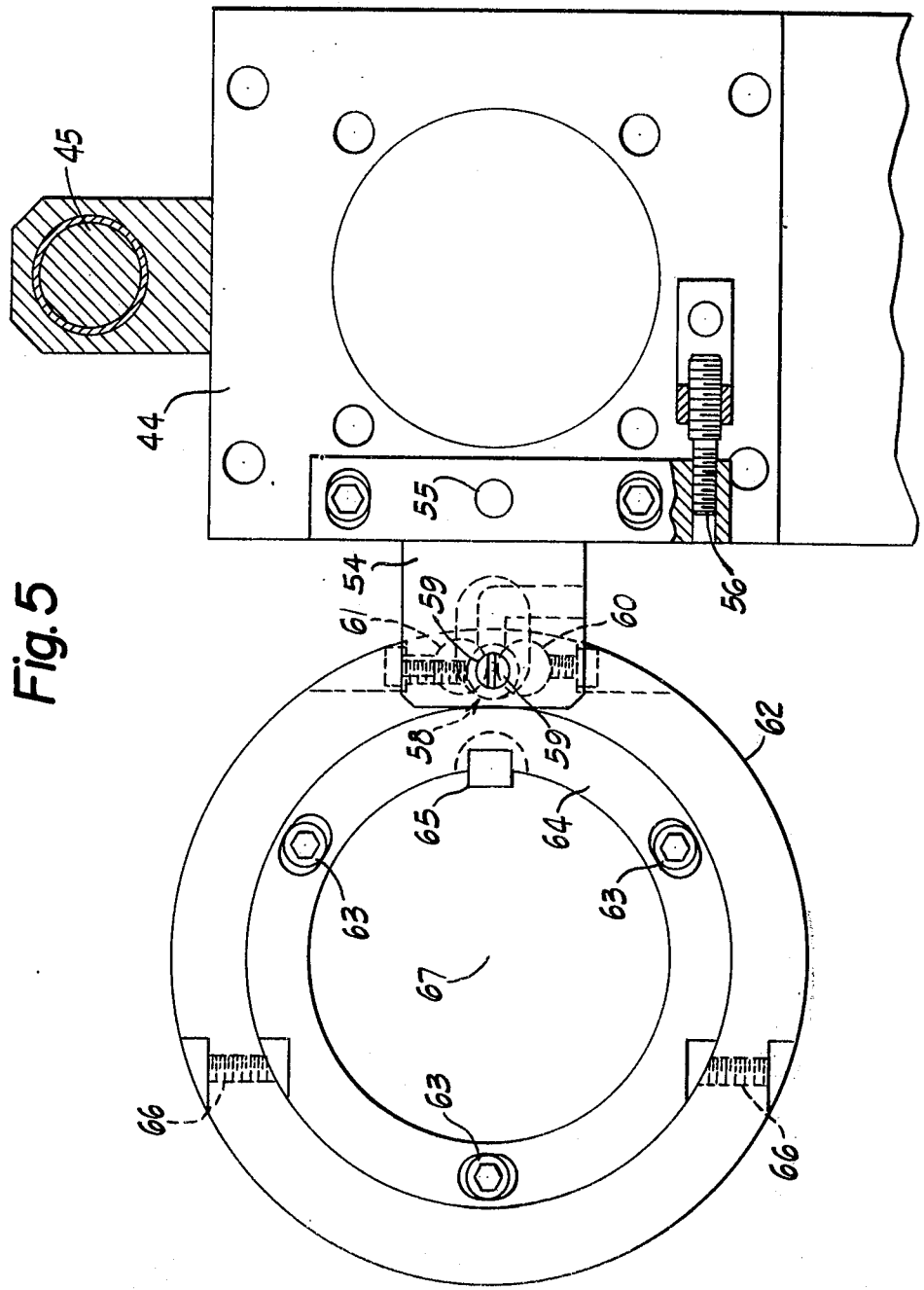

FIGS. 3, 4 and 5 show in greater detail the spindle positioning mechanism 11 as used with one of the spindles 12. This spindle 12 has a spindle tube 38 through which bar stock may be fed if this is an automatic bar machine, which requires a hollow spindle in order to feed the long bars from which the workpieces are successively cut. A motor 40 is provided for the spindle positioning mechanism 11 and this is a stepping motor in this preferred embodiment. The motor 40 drives through a speed reducing device 41 to a gear 42. FIG. 4 shows that this gear 42 may selectively be in mesh with a gear 43 on the spindle 12. This FIG. 4 also shows the bar 32 from which the workpiece is cut at the front end of the spindle 12. The motor 40 and speed reducer 41 are mounted on a plate 44 pivoted at 45 from the machine frame 16. A fluid cylinder 46 has an internal piston connected to a piston rod 47 which is pivoted at 48 to an intermediate point on an arm 49 which in turn is pivoted at 50 to the frame 16.

When fluid is admitted to the cylinder 46 to move the piston rod 47 to the right, then the plate 44 is moved to the left as shown in the solid lines in FIG. 4 and the gears 42 and 43 are in mesh. The proper engagement of the gear teeth so as to eliminate backlash is provided by a stop screw 51. When the fluid is admitted to the cylinder 46 to move the piston rod 47 to the left, then the arm 49 pivots clockwise and the plate 44 is pulled counterclockwise to the dotted line position 44A which disengages the gears 42 and 43. This is a clutch means to engage and disengage the spindle positioning mechanism 11 from the particular one of the six spindle gears 43 on the six spindles of the spindle carrier 13. This clutching means is required because the spindle positioning mechanism 11 must be disengaged from a particular spindle gear so that the spindle carrier 13 may be indexed by the indexing mechanism 27. Then when the next spindle has been indexed into the spindle position for which the mechanism 11 is provided, the clutching means is actuated to engage the gears 42, 43. In that way the spindle positioning mechanism 11 may be used successively with each of the six spindles in the carrier 13 and may be used to precisely position the rotational position of each of the spindles in turn.

Figure 6:
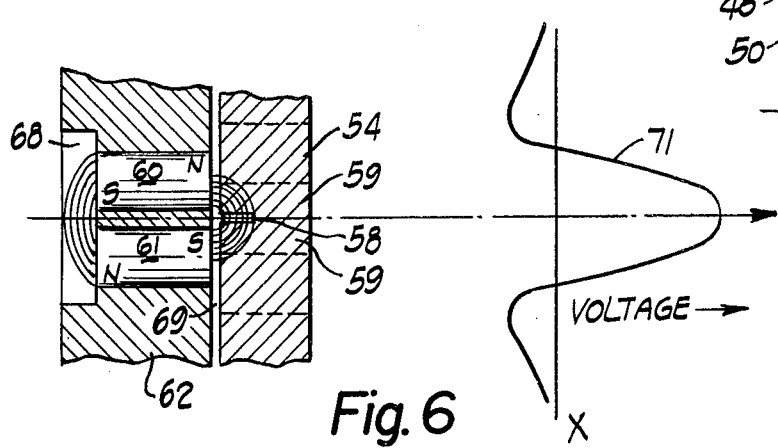
FIG. 6 is a section through the magnets cooperating with the sensor and showing the voltage developed.

FIG. 5 shows in greater detail a sensor means 58 which is used to provide the reference pulse signal once per revolution of the respective spindle. An arm 54 is pivoted at 55 to the plate 44 and held in place by an adjusting screw 56. The sensor means 58 is in this preferred embodiment a Hall effect sensor which is a flat wafer or crystal having a thin thickness dimension relative to the width and length. The thickness dimension is shown in FIG. 5. The sensor 58 is held between two magnetically permeable semi-cylindrical shoes 59 to direct flux through the Hall effect sensor in a direction parallel to its thickness dimension. The sensor 58 is activated by a change in magnetic flux and in this preferred embodiment, this is effected by a pair of permanent magnets 60, 61 which are generally cylindrical and held in a non-magnetic ring 62. The ring 62 is mounted by screws 63 to a second ring 64 which is keyed at 65 to the spindle tube 38. Jack screws 66 can be adjusted to establish the center line of the permanent magnets 60, 61 directly on the centerline of the key 65 so as to have a reference line which intersects the spindle axis 67, and as will later be shown, also intersects the spindle carrier axis 14. As better shown in FIG. 3, there is an air gap 69 between the sensor 58 and the permanent magnets 60, 61. This air gap may be radial or as shown in the preferred embodiment may be an axial air gap. FIG. 6 also diagrammatically shows the support arrangement for the magnets and the sensor 58 and shows that in this preferred embodiment the permanent magnets 60, 61 are oppositely poled for opposite poles at the pole faces adjacent the air gap. A magnetic bar 68 may be used to provide a better flux path for the flux of the magnets which jumps the air gap 69 and passes through the semi-cylindrical shoes 59 to thread through the Hall effect sensor 58 in a direction substantially parallel to the thickness dimension of the sensor and substantially perpendicular to the air gap 69. FIG. 6 also shows a typical voltage curve 71 which may be established by the relative rotation between the sensor 58 and the permanent magnets 60, 61. This voltage curve 71 is plotted with voltage on the abscissa and relative movement along the ordinate. The Hall device has current electrodes along two edges so that current flows through the width dimension of the Hall crystal. Then when a changing flux is impressed on the thickness dimension of this Hall device, a Hall voltage is developed across voltage electrodes connected on opposite ends of the length dimension of the device. Alternative arrangements of the magnets and the Hall sensor may be used but this one has been found to be quite satisfactory and the reference pulse signal 71 is developed as a peak output voltage from the sensor 58 as the magnets pass this sensor.

FIG. 7 shows a schematic block diagram of the spindle positioning mechanism 11. The spindle carrier 13 is partly shown with a spindle 12 therein being that which is to be precisely positioned by the mechanism 11. The stepping motor 40 is shown in FIG. 7 as connected through the speed reducer 41 and through the motor clutch 42, 43 which is the meshing or disengagement of the gears 42, 43, to the spindle 12. The spindle 12 is shown as connected to drive the transducer or Hall effect sensor 58 which is connected through a pulse shaping circuit 75 to a set input 76 of a counter 77. The counter 77 also has a pulse input 78 from a rotary pulse generator 79 driven from the output shaft of the stepping motor 40. The connection from the generator 79 to the counter input 78 includes a divide by 16 device 80 so that the counter 77 counts only every 16th pulse generated by the generator 79. The counter 77 has an output supplied to a control means 81 which in turn controls a motor drive circuit 82 through either a high speed control 83 or a low speed control 84. Motor drive circuit 82 has an output energizing the stepping motor 40. This motor drive circuit is controlled by a direction selector 85.

The pulse generator 79 has an output on a channel 86 to the control means 81 which also has an input at 87 from an initialization device 88 which may include a device such as switches 89 and 90. The control means 81 also has a connection 92 to a rotary distributor 93. This distributor is in the form of an interrupted slip ring supplying energy over a brush 94 and an outer group of conductive segments 96 to the six spindle clutches 24. Also a brush 95 makes contact with an inner group of commutator segments 97 controlling energization to the six spindle brakes 25. As diagrammatically illustrated in FIG. 1, this distributor 93 is driven for rotation with the spindle carrier 13 for selective energization of the spindle clutch 24 and spindle brake 25 both during indexing and during the time that this spindle carrier has been locked at a particular spindle position.

FIG. 7 also shows the tool slide 30 as controlling actuation of a switch 98 when the slide is in the forward position and a switch 99 when the slide 30 is in the retracted position. These two switches are connected to control the control means 81. The presettable counter 77 has a first index register 101, a second index register 102 and may optionally have a deceleration register 103. Each of these registers has a decimal to binary coded decimal converter 104 connected between the register and the counter 77.

The initialization means 88 is also connected through a fluid valve 106 to control the motor clutch 42, 43.

OPERATION

The drawing illustrates the preferred embodiment of the shaft positioning mechanism 11 which may be used to position a spindle or a machine shaft with a high degree of accuracy. In one actual machine constructed according to the invention, the mechanism 11 had a spindle positioning capability of 1°, meaning that it could be positioned in any one of 360 different positions around the spindle axis 67, and had an accuracy of + or − 1/10 of a degree for each positioning. A number of motors 40 may be used, but one which has been found to be satisfactory is the Model S-225 stepping motor made by Warner Electric Brake and Clutch Company. This is an AC three-phase stepping motor having 7½ degree increments for each step, and having a built-in rotary pulse generator 79 generating a pulse for each step which it has moved. This motor has a maximum pulse rate before saturation of about 4,000 pulses per second, and with 48 pulses per revolution, this gives about 83 revolutions per second or 5,000 rpm of the stepping motor 40. The speed reducer 41 can be of any suitable ratio and one used in the machine as constructed according to the invention had a stepdown ratio of 120 to 1. Accordingly, at the maximum speed of the stepping motor 40, the spindle 12 is rotated at about 42 rpm. As the spindle is rotated by the motor 40, the sensor 58 has only 1 pulse per revolution of the spindle. This is a reference signal pulse, which may be made more of a rectangular pulse by the pulse-shaping circuit 75, and is used at the input 76 to set the counter 77, by transferring the preset number from index register 101, for example, into counter 77. With 48 pulses per revolution of the stepping motor 40 being emitted by the pulse generator 79, and only 1 signal pulse per revolution of the spindle from the sensor 58, plus taking into consideration the speed reducer of 120:1, 48 times 120 shows that there will be 5,760 pulses at the input to the divider 80 for each reference pulse on the set input 76. After passing through the divider 80 which divides by 16, there will be 360 pulses at the counter input 78 for each reference pulse on the counter set input 76. This ratio is desired because there are 360° per revolution.

The first index register 101 has thumb wheel switches to set a three digit number up to a maximum of 360. This will be presetting a given count in this counter 77 and will establish a preset amount of angular rotation desired for the spindle 12 after passing a reference point. FIGS. 4 and 5 show that a reference plane may conveniently be established when the spindle key 65 is aligned in the same plane with the spindle carrier axis 14 and the spindle axis 67. The centerline of the magnets 60, 61 lies along this reference plane as adjusted by the jack screws 66. Also the adjusting screw 56 may be adjusted to position the Hall effect sensor so that the maximum Hall voltage output pulse 71 occurs as the magnets 60, 61 pass this reference plane.

The spindle 12 may be precisely positioned for any number of reasons. Usually in a multiple spindle automatic machine the spindles 12 all rotate simultaneously by means of the central drive gear 22 driving each of the spindles through the spindle clutches 24. However, it may be desirable to stop the spindle which at that time is in a particular spindle position in order to perform a cross drilling, cross-tapping or cross-milling function or the like. For example, it may be desired to mill hexagonal or square flats upon the workpiece by a mechanism on a cross-slide and the spindle must necessarily be stopped before this operation.

FIG. 2 shows a drill 108 mounted on the cross-slide 33 and this is an example of a cross-drilling attachment which in FIG. 2 is shown as having the drill 108 moved at a 20° angle relative to the reference plane joining the spindle carrier axis 14 and the spindle axis 67. Accordingly, an example of an operation of the spindle positioning mechanism 11 is to stop the spindle, engage the clutch 42, 43, rotate the spindle by means of the stepping motor 40 until a reference pulse signal is obtained from the Hall effect sensor 58, then stop the spindle. Because of the random meshing of the gears 42, 43 and the random engagement of the spindle drive clutch 24, the exact position of the spindle is not known when the spindle clutch 24 is disengaged and the spindle brake 25 is engaged. However, the position of the spindle is precisely known whenever the reference pulse is developed from the Hall effect sensor 58. Accordingly, this reference pulse signal is used to set the counter 77 and it then counts down the first preset amount set in the first index register 101. In the above example with the drill 108 set at a 20° angle to the reference plane, the first index register would be set for 20° as shown in FIG. 7. If a second operation is desired in this same spindle division, such as deburring the opposite end of the cross-drilled hole, then the drill 108 may have an enlarged countersinking shoulder thereon remote from the cutting tip and the second index register 102 would be used. Since the workpiece 32 would need to be rotated 180° after the drilling, the second index register would be set for 180° as shown in FIG. 7, and then the slide 33 could be moved forwardly for this deburring or countersinking operation on the opposite end of the drilled cross hole.

FIG. 2 also shows a tap 109 mounted on a crossslide 34 for cooperation with the spindle in the next adjacent spindle position of the carrier 13. Thus, after the crosshole is drilled, it may be tapped in the next station. It however, is shown in FIG. 2 that this tap 109 reciprocates in a horizontal plane which is at a 60° angle relative to the reference plane formed by the spindle carrier axis 14, the spindle axis 67 and the key 65. Accordingly, for the spindle positioning mechanism 11 in use with that spindle station, the first index register, not shown, would be set for 60°. The second index register 102 would not be used and accordingly could be set for 60° the same as the first index register or could be disabled. As an example, the schematic diagram of FIG. 7 will be illustrated as performing the drilling operation by the drill 108 in the cross-slide 33. During the indexing motion of the spindle carrier 13 by the indexing mechanism 27, there will be relative rotation between the brushes 94, 95 and the distributor 93. This may be used to de-energize the spindle drive clutch 24 so that the drive from drive means 18 is interrupted. It also may be used to de-energize the spindle drive clutch 24 so that the drive from drive means 18 is interrupted. It also may be used to energize the spindle drive brake 25 to bring that particular spindle to a halt and this may be accomplished during indexing so that the spindle is completely stopped when that particular spindle is indexed with the spindle carrier 13 in that spindle station at which the positioning mechanism 11 is located. The spindle brake 25 must be disengaged prior to the positioning by spindle positioning mechanism 11.

The indexing locking arm 28 is shown as actuating switch 89 which is a part of the initialization means 88, and this starts the entire sequence of operation of the spindle positioning mechanism. As stated above, the stepping motor 40 may be a Warner S-225 unit which also includes the rotary pulse generator 79. This Warner unit also is available commercially with a motor drive circuit which includes the motor drive circuit 82, the high and low speed controls 83 and 84, the control means 81 and the direction selector 85. This initialization means 88 directly controls the fluid valve 106 to engage the clutch 42, 43 which means that the gears 42 and 43 come into mesh. Also this initialization starts the control means 81 so that the motor drive circuit 82 starts the motor 40 at high speed by means of the high speed control 83. The direction selector 85 would be set for either clockwise or counter-clockwise rotation whichever is desired. As shown in FIG. 2 it would be best to have counter-clockwise rotation of 20° to reach the desired cutting position relative to the reference plane, because if it were to rotate clockwise, it would have to rotate 160° to reach the proper cutting plane.

The motor 40 starts out in high speed rapidly accelerating to such high speed. Because of the random meshing of the gears, it is not known how far the motor will have to rotate the spindle in order to have the reference pulse signal from the sensor 58. It may have a minimum of 0° or a maximum of 360° before such reference pulse signal is emitted and on an average this will be 180°. Upon such reference signal being emitted by the sensor 58, this is passed to the start input 76 of the counter 77 which then starts to count the pulses coming in on the pulse input 78. As explained above, there is one pulse for each degree of rotation of the spindle 12 and the first index register 101 starts to count down towards zero. In the meantime the stepping motor has been running at a maximum rate for a maximum rate of spindle positioning. The initialization means 88 has established the control means 81 as emitting a first single pulse which steps the stepping motor by one step, in this example by 7.5°. From then on the rotary pulse generator emits a pulse for each step moved and this is fed back on channel 86 for a minor loop control of the stepping motor 40 to keep the motor running with a pulse input precisely with each step movement of such motor. The successive application of pulses actually makes this motor rotate at a substantially constant rate of speed, rather than in discrete steps.

It takes a finite time to decelerate the stepping motor 40 from its high rate of speed and accordingly, a low speed control 84 is provided from which the stepping motor 40 may stop without over-running a single step. For this purpose the deceleration register 103 may be provided or it may be merely an internal control without external access by the machine operator. In one embodiment of the positioning mechanism made according to the invention, it has been found that the low speed of the motor may be 360 rpm of the stepping motor which is 3 rpm of the spindle 12. The deceleration rate of the spindle may vary due to varying conditions of inertia, speed, friction and lubrication. If it takes 2° or 3° of spindle rotation to stop the spindle from high speed, then the deceleration register 103 may be set at some value higher than this for safety, for example, 7°. This means that as the motor is running at high speed counting down from the 20° in the first index register, when the counter reaches 7° from the reference plane, then the motor will decelerate and run at low speed by means of the low speed control 84. When the counter does count out to zero, the counter 77 emits a signal which blocks the next feedback pulse on channel 86 and the stepping motor 40, not receiving any more pulses, stops immediately without over-running. Accordingly, the spindle 12 is precisely positioned for the subsequent cross-drilling operation by the drill 108.

The drill cross-slide may have switches such as switches 98 and 99 to sense the slide forward and the slide retracted conditions as moved by the cam means 20. When this cross-drilling operation has been completed, it may be desired to rotate the workpiece 32, 180° for a deburring operation on the rear of the cross-drilled hole. Accordingly, the control means 81 is again enabled by the actuation of the slide retract switch 99. A pulse is emitted by the control means 81 through the high speed control 83 and the motor 40 again accelerates and runs in high speed. The location of the spindle is already known for second positioning operation at the same spindle station, so it is not necessary to again have a reference pulse from the sensor 58. Accordingly, the stepping motor pulse generator 79 sends pulses directly to the counter 77 and the second index register 102 is then in control with the pulses on pulse input 78 counting down from the second preset condition on this register 102. Again when the spindle reaches 7° from the desired location, the deceleration register 103 establishes deceleration of the stepping motor to the low speed condition and then when the second preset position is counted down to zero, the stepping motor 40 stops immediately at this location. The deburring or counter-sinking operation may then take place by having the drill 108 and its countersinking shoulder move forward toward the workpiece 32 and return. This will complete the operation of the spindle positioning mechanism 11 and accordingly, the fluid valve 106 will be de-activated to disengage the clutch 42-43. The positioning mechanism 11 is then in condition to have the spindle carrier 13 indexed to the next station.

During such spindle carrier indexing, normally the spindle drive clutch 24 would be re-energized in order to drive the spindle from the central drive gear 22. However, in this particular case where cross-tapping from the tap 109 is desired, the spindle would remain stopped and preferably with the spindle brake 25 engaged to make sure that this spindle 12 did not rotate during the carrier indexing. In this next spindle station with the spindle already stopped and its actual location known from the preceding station, there is no actual need for a reference pulse being emitted by the sensor 58. Accordingly, for this next station only the first index register 101 would be used and would be set at 40°. A 60° orientation of the cutting plane relative to the reference plane is required, however, it will be remembered that the spindle has already been positioned at 20° relative to the cutting plane. Accordingly, another 40° counter-clockwise rotation is all that is required and hence this first index register would be set at 40°. The direction selector would be set for counter-clockwise rotation and when the switch 89 of the initialization means 88 was actuated, which would indicate that the carrier indexing had been completed, then the positioning mechanism could start. This would mean that the clutch 42,43 would be engaged and the stepping motor 40 would accelerate to high speed and run at high speed as the counter 77 counted down from 40° to 7°. At the 7° point the deceleration register would decelerate the motor to low speed and when the counter counted down to zero, the motor would be stopped at that step. The last pulse is continued to be applied to this stepping motor to provide a locking torque holding the motor in that position. This motor acting through the 120:1 speed reducer 41 establishes a quite high locking torque on the spindle 12 and this can resist many off center cross-machining functions. Additionally the spindle brake 25 may be actuated for additional braking torque. The cross-slide 34 would next move forwardly to perform the tapping or threading function of the workpiece, and then retract, completing this use of the positioning mechanism 11, thus clutch 42,43 would be disengaged.

The spindle positioning mechanism 11 also provides a contouring capability. The end tool slide 30 shown in FIG. 1 moving parallel to the spindle carrier axis 14, in combination with controlled rotation of the spindle by the stepping motor 40, will perform contouring on a workpiece. For example, suppose an oil groove 110 is desired to be machined in a cylindrical surface either external or internal. The contour of the cam on the cam drum 20 will permit controlled movement in an axial direction of the tool 31. In such contouring action, the counter 77 is not needed nor is the sensor 58, although both may be used as described above if the contouring cutting action is to be started at a predetermined location around the periphery of the workpiece 32.

For a contouring action, the stepping motor 40 may be operated in the low speed mode, for example, 3 rpm, and the shape of a cam on the cam drum may easily be configured to perform the necessary contouring cutting function, for example, an oil groove 110 on the cylindrical workpiece surface. Alternatively, the cutting tool may be on one of the cross-slides in cooperation with the low speed rotation of the motor 40 and this would perform a contouring action by changing the radial dimension or depth of cut as the workpiece rotated.

The spindle positioning mechanism 11 provides many novel features and provides a high degree of accuracy of controlling the location of the spindle 12.

The spindle positioning mechanism 11 as described has a Hall effect sensor 58 to establish a pulse or reference signal in accordance with rotation of the spindle; namely, 1 reference pulse per revolution of the spindle. Also the stepping motor drives a rotary pulse generator 79 and there are many pulses generated for each reference signal and this means that the pulse generator generates a pulse for each minor fraction of a revolution of the spindle. For convenience this has been chosen as generating 5,760 pulses for each reference pulse from the sensor 58, but this is merely by way of example. The divide by 16 divider 80 then reduces this number of pulses to 360:1 on the input to the counter 77 so that there is a pulse for each degree arc of rotation of the spindle 12. This coincides with the index registers 101 and 102 which may be programmed; that is, preset to establish a desired location of the spindle for any one of 360° around the periphery of the workpiece. Actually, a device as constructed in accordance with the invention had such provisions of 1° increments of positioning and additionally the spindle positioning mechanism was sufficiently accurate to provide a repeatability of setting within 0.15° of arc. This is highly important where one intends to drill in a first station and then tap in a subsequent station as described above. If the drilled cross-hole is not sufficiently closely aligned with the translational movement of the tap, then the tap will not be able to enter the hole and there is danger of breaking the tap or the workpiece. The present invention provides this sufficient accuracy to perform this type of machining operation.

The spindle positioning mechanism 11 provides a means to control the spindle 12 in accordance with the pulses from the generator means 79. It performs this function by counting the number of pulses emitted by the generator 79 and being able to stop the spindle at a precise location in accordance with the counted pulses. The fact that there is a speed reducing mechanism 41 between this stepping motor and the spindle 12 assures that there will be a large number of pulses from the pulse generator 79 for each revolution of the spindle 12. The Hall effect sensor 58 emits a reference signal which is applied to the start input 76 of the counter 77. Accordingly, when the spindle has reached a reference position in the reference plane, then this enables the counter 77 by having it start to count the pulses already being applied thereto from the pulse generator 79. In this way a reference position of the spindle is known and by counting the pulses, a predetermined angle of rotation of the spindle may be programmed by presetting the counter and when the counter counts down to zero the spindle stops at the preset position. The direction selector 85 may establish clockwise or counter-clockwise rotation of the motor 40. Where the motor is a three phase motor, this may simply be accomplished by reversing the phase sequence of energization of the motor windings.

Any number of index registers 101 and 102 may be employed in the counter 77 so that any multiplicity of successive spindle positionings may be accomplished during one spindle position of the spindle carrier 13.

The spindle drive clutch 24 normally provides rotation of the spindles from the drive means 18. However, when the spindle positioning mechanism 11 is used with the machine tool 15, then the drive clutch 24 is disengaged and the spindle drive brake 25 is engaged in order to stop the spindle, preferably during indexing of the spindle carrier 13. Accordingly, the initialization means 88 is responsive to the disengagement of the drive clutch 24 and is also responsive to the engagement of the drive brake 25 and subsequent disengagement of the brake 25 in order to engage the motor clutch means 42, 43.

As shown in FIGS. 3, 4 and 5, the magnet means to energize the Hall effect sensor 58 includes a pair of magnets in this preferred embodiment. The magnet means accordingly are mounted on non-magnetic rings and there is one ring for each of the plurality of spindles in the spindle carrier. In this way the spindles 12, as they successively move to a particular spindle carrier station, may cooperate with the Hall effect sensor 58 and the gear 42 may successively cooperate with any one of the plurality of spindle gears 43.

The spindle positioning mechanism of the present invention is far superior to any system attempting to use the spindle clutch 24 and spindle brake 25 to stop the spindle at some supposedly precise location. One reason is the large inertia of the parts. In a multiple spindle automatic bar machine, the bars from which the workpieces are machined might be 16 feet long to start with and of course pieces are successively machined until the bar is only a few inches long. This is a large change in mass of the workpiece and accordingly is a large change in inertia. Such change in inertia would considerably affect the stopping time of the spindle so any system which tries to utilize the spindle brake 25 cannot be nearly as precise as the present invention. Also the large time constant for the electromagnetic clutch and brake 24, 25 precludes rapid operation for precise stopping of the spindle 12.

In this multiple spindle automatic machine tool 15, the spindle positioning mechanism may be built into each spindle and rotate with the spindle carrier. However, this means six of the spindle positioning devices instead of only one and further complicates the problem of supplying electrical energy because everything would be mounted on the rotatable spindle carrier 13. Accordingly, the mechanism as shown is the preferred embodiment. In this spindle positioning mechanism 11, it is not possible to have a closed loop system, see FIG. 7, from the spindle through the sensor 58 and back to the control of the stepping motor 40. The reason for this is because the gears 42, 43 form a clutch and these gears disengage. They also re-engage at some random location which is impossible to predict. Accordingly, the present invention incorporates an incremental system, not an absolute system of feedback in order to complete the feedback loop. The present invention also incorporates the minor loop including channel 86 around the motor 40 in order to make sure that pulses are fed to the motor 40 in the right phase angle of lead so that the motor is not fed with pulses faster than it can respond. If it did, then there could be a skipping of a pulse which would destroy the accuracy of the positioning.

The shaft positioning mechanism 11 of the invention has been described in the preferred embodiment as being used to rotate a spindle in which a workpiece is located. The shaft positioning mechanism 11 may also be used to rotate other types of shafts for example, a machine tool shaft which has a screw meshing with a nut to move a slide. Accordingly, when the shaft rotation is precisely controlled and positioned, this will control the longitudinal positioning of the slide moved by the nut. With the high degree of accuracy obtainable by the present invention; namely, within .15°, and when multiplied by the longitudinal movement ratio of a screw and nut, this could be a positioning accuracy of the slide within 0.0001 inches or even 0.00001 inches.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A rotatable shaft positioning mechanism, comprising in combination,
   sensor means,
   activator means cooperable with said sensor means,
   means to relatively rotate said sensor means and said activator means in accordance with rotation of the shaft to establish a reference signal output of said sensor means,
   a motor,
   means to connect said motor to rotate the shaft,
   means generating a pulse for each minor fraction of a revolution of the shaft,
   and means to control the shaft in accordance with the said reference signal output and with the pulses from said generator means.

2. A positioning mechanism as set forth in claim 1, wherein said pulse generator means includes a means driven by said motor, and a speed reducing mechanism connected between said motor and the shaft to establish a large number of pulses from said pulse generator means for each revolution of the shaft.

3. A positioning mechanism as set forth in claim 2, wherein said control means includes means to count pulses from said generator means output, and initialization means to have said control means start said motor to rotate the shaft and the reference signal output of said sensor means start said counter to control the shaft in accordance with the pulses counted from said generator means.

4. A positioning mechanism as set forth in claim 3, wherein said counter stops the shaft at a first preset location upon the counting of a first predetermined number of pulses,
   and means to determine the direction of rotation of the shaft by said motor.

5. A positioning mechanism as set forth in claim 4, including means to count a second predetermined number of pulses from the pulse generator means in accordance with rotation of the shaft in the determined direction.

6. A positioning mechanism as set forth in claim 3, wherein said counter means has a first input connected to said pulse generator means and has a second input connected to said sensor means.

7. A positioning mechanism as set forth in claim 3, wherein said motor connecting means includes motor clutch means.

8. A positioning mechanism as set forth in claim 7, including drive means to rotate the shaft,
   a drive clutch in said drive means, and said initialization means being responsive to disengagement of said drive clutch to engage said motor clutch means.

9. A positioning mechanism as set forth in claim 8, including a brake in said drive means,
and said initialization means being responsive to engagement and disengagement of said brake.

10. A positioning mechanism as set forth in claim 5, including cam means connected to move a tool carrier, means to actuate said cam means to move the tool carrier to perform a first work cycle on a workpiece moved by rotation of the shaft,
means to preset a second count in said counter,
means to actuate said initialization means a second time to activate said control means to start and rotate said motor a second time to count said second preset amount of pulses in said counter and then stopping said motor and the shaft at a second preset location,
and means to actuate said cam means to move said tool carrier to perform a second work cycle on a workpiece moved by rotation of the shaft.

11. A positioning mechanism as set forth in claim 1, including drive means to drive the shaft,
cam means to move a tool carrier relative to the spindle,
means mounting a tool on the tool carrier,
and said control means being connected to control the motor to rotate the shaft independently of the drive means and in timed relationship to the movement of the tool carrier by the cam means to perform a contouring cutting action on the workpiece rotated by the shaft.

12. A positioning mechanism as set forth in claim 1, wherein said motor is a stepping motor,
said control means including means to count pulses from said generator means output,
and means to continuously apply the last counted pulse to said motor to develop a motor holding torque.

13. A positioning mechanism as set forth in claim 1, including means to move a tool carrier relative to the shaft,
means mounting a tool on the tool carrier,
and said control means being connected to control the rotation of the shaft by said motor and in timed relationship to the movement of the tool carrier to perform a contouring cutting action on a workpiece moved by rotation of the shaft.

14. A positioning mechanism as set forth in claim 13, wherein said control means controls the motor to rotate the shaft at a substantially constant speed.

15. A positioning mechanism as set forth in claim 13, including means to select a high or a low speed rotation of the shaft by said motor.

16. A positioning mechanism as set forth in claim 15, wherein said control means includes a means to stop the shaft by decelerating from the high speed condition to a low speed condition and then stopping the shaft upon a given number of pulses from said generator means.

17. A spindle positioning mechanism for use with a multiple spindle automatic machine tool having a plurality of spindles in an indexable spindle carrier and driven from drive means, and with cam means to move a tool carrier relative to the spindles, comprising in combination,
sensor means,
activator means cooperable with said sensor means,
means to relatively rotate said sensor means and said activator means to establish a pulse output of said sensor means in accordance with rotation of one of the spindles,
motor means separate from the drive means,
means to connect said motor means to rotate one of the spindles,
a tool moved with the tool carrier,
and means to control said motor means in accordance with said sensor means pulse output and with a pulse from said sensor means to rotate the spindle independently of the drive means and in timed relationship to the movement of the tool carrier by the cam means to perform a contouring cutting action on a workpiece in the spindle.

18. A spindle positioning mechanism as set forth in claim 17, wherein said control means includes means to operate said motor means at a substantially constant relatively slow speed to combine with the shape of the cam means to establish a desired contouring cutting action.

19. A spindle positioning mechanism for use with a multiple spindle automatic machine tool having a plurality of spindles in an indexable spindle carrier and driven from drive means, comprising in combination,
Hall effect sensor means,
magnet means,
means providing relative rotation between said means in accordance with rotation of one of the spindles to establish a pulse output of said sensor means,
motor means,
means to connect said motor means to rotate one of the spindles,
and means to control said motor means in accordance with a pulse from said sensor means.

20. A spindle positioning mechanism as set forth in claim 19, wherein said magnet means includes a pair of permanent magnets closely spaced relative to the diameter of a spindle.

21. A spindle positioning mechanism as set forth in claim 23, wherein said permanent magnets are substantially parallel and are oppositely poled.

22. A spindle positioning mechanism as set forth in claim 19, wherein said magnet means includes two opposite pole faces closely spaced relative to the diameter of a spindle and with the pole faces adjacent the air gap between a rotatable spindle and the frame of the machine tool.

23. A spindle positioning mechanism as set forth in claim 22, wherein said magnet means are mounted on each of the spindles,
and means mounting said Hall effect sensor means in a magnetically permeable member in the machine tool frame to receive flux from said pole faces.

24. A spindle positioning mechanism as set forth in claim 23, wherein said sensor means has a thin thickness dimension relative to the width and length thereof,
said magnetically permeable member establishing a substantially semi-cylindrical flux path to the spindle air gap,
and said mounting means mounting the thickness dimension of said sensor means substantially perpendicular to said flux path and to said air gap.

* * * * *